(12) United States Patent
Kobayashi (10) Patent No.: US 9,451,016 B2
(45) Date of Patent: Sep. 20, 2016

(54) INFORMATION PROCESSING SYSTEM, CLIENT APPARATUS, SERVER APPARATUS, AND NON-TRANSITORY COMPUTER READABLE MEDIUM

(71) Applicant: FUJI XEROX CO., LTD., Minato-ku, Tokyo (JP)

(72) Inventor: Takumi Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 196 days.

(21) Appl. No.: 14/107,753

(22) Filed: Dec. 16, 2013

(65) Prior Publication Data

US 2014/0379781 A1 Dec. 25, 2014

(30) Foreign Application Priority Data

Jun. 20, 2013 (JP) ................................. 2013-129400

(51) Int. Cl.
*H04L 29/08* (2006.01)
*H04L 29/06* (2006.01)

(52) U.S. Cl.
CPC ............... *H04L 67/10* (2013.01); *H04L 67/38* (2013.01)

(58) Field of Classification Search
CPC ........................................................ H04L 67/10
See application file for complete search history.

(56) References Cited

U.S. PATENT DOCUMENTS

| | | | | | |
|---|---|---|---|---|---|
| 5,377,317 | A | * | 12/1994 | Bates | G06F 3/0481 714/E11.188 |
| 7,672,235 | B1 | * | 3/2010 | Lian | H04L 12/66 370/230 |
| 8,712,883 | B1 | * | 4/2014 | Yang | H04L 12/14 375/240 |
| 2003/0063119 | A1 | * | 4/2003 | Bloomfield | G06F 9/542 715/738 |
| 2007/0094405 | A1 | * | 4/2007 | Zhang | H04N 7/17318 709/231 |
| 2009/0198907 | A1 | * | 8/2009 | Speight | G06F 12/0862 711/137 |
| 2010/0115401 | A1 | * | 5/2010 | Nordine | G06F 17/24 715/255 |
| 2010/0313199 | A1 | * | 12/2010 | Chen | G06F 9/5055 717/177 |
| 2010/0332674 | A1 | * | 12/2010 | van Gassel | H04L 67/104 709/231 |
| 2011/0035435 | A1 | * | 2/2011 | Meng | G06F 9/54 709/203 |
| 2011/0216648 | A1 | * | 9/2011 | Mehrotra | H04L 47/30 370/230 |
| 2012/0151365 | A1 | * | 6/2012 | Tam | G06F 3/0481 715/738 |

FOREIGN PATENT DOCUMENTS

| | | |
|---|---|---|
| JP | 2000-285062 A | 10/2000 |
| JP | 2005-517254 A | 6/2005 |
| JP | 2011-070640 A | 4/2011 |
| WO | 03/067568 A1 | 8/2003 |

\* cited by examiner

*Primary Examiner* — Philip Chea
*Assistant Examiner* — Wuji Chen
(74) *Attorney, Agent, or Firm* — Sughrue Mion, PLLC (57) ABSTRACT

An information processing system includes a server apparatus and a client apparatus. The server apparatus includes the following components. An execution unit executes first applications. An execution controller causes, when a second application is executed, the execution unit to execute one of the first applications corresponding to the second application. A generation unit generates a first screen based on the first application. A transmission unit transmits information representing the first screen. The client apparatus includes the following components. A request unit requests execution of the first and second applications. A first acquisition unit acquires the information representing the first screen. A second acquisition unit acquires information representing a second screen based on the second application. A display displays the first screen. A display controller causes, when the first screen includes the image of the first application corresponding to the second application, the display to display the second screen.

9 Claims, 10 Drawing Sheets

| ORDER | WINDOW ID | APPLICATION URI |
|---|---|---|
| 1 | W1 | http://a**.org/webapp/1 |
| 2 | W2 | http://b**.com/app/2 |
| 3 | W3 | http://b**.com/app/3 |
| 4 | W4 | http://c**.org/webapp/4 |
| ⋮ | ⋮ | ⋮ |

INFORMATION PROCESSING SYSTEM, CLIENT APPARATUS, SERVER APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-129400 filed Jun. 20, 2013.

BACKGROUND

Technical Field

The present invention relates an information processing system, a client apparatus, a server apparatus, and a non-transitory computer readable medium.

SUMMARY

According to an aspect of the invention, there is provided an information processing system including a server apparatus and a client apparatus. The server apparatus includes an execution unit, an execution controller, a generation unit, and a transmission unit. The execution unit executes plural first applications each of which makes a display request to display a corresponding image. The execution controller causes, in a case where a second application which is an application of a different type from the first applications and for which an execution request has been made by the client apparatus is executed by the server apparatus, the execution unit to execute one of the first applications that corresponds to the second application. The generation unit generates a first screen from an image for which the display request has been made as a result of the corresponding first application being executed by the execution unit. The transmission unit transmits information representing the first screen generated by the generation unit to the client apparatus. The client apparatus includes a request unit, a first acquisition unit, a second acquisition unit, a display, and a display controller. The request unit makes an execution request to execute any one of the first applications and an execution request to execute the second application. The first acquisition unit acquires the information representing the first screen from the server apparatus. The second acquisition unit acquires information representing a second screen generated as a result of the second application being executed by the server apparatus. The display displays the first screen. The display controller causes, in a case where the first screen includes the image of the one of the first applications that corresponds to the second application, the display to display the second screen generated as a result of the second application being executed.

BRIEF DESCRIPTION OF THE DRAWINGS

An exemplary embodiment of the present invention will be described in detail based on the following figures, wherein.

DETAILED DESCRIPTION

1. Exemplary Embodiment 1-1. Overall Configuration

Figure 1:
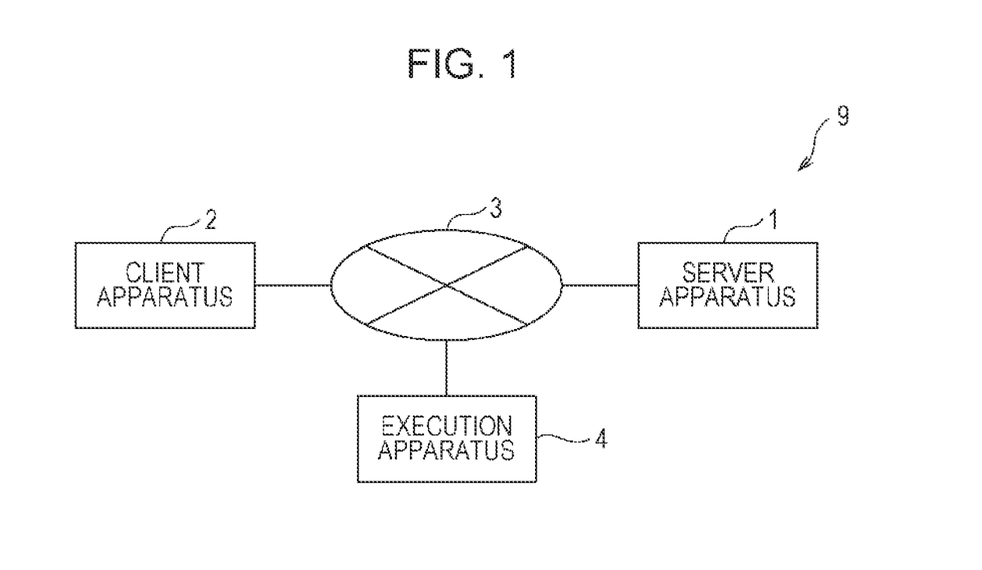
FIG. 1 illustrates the overall configuration of an information processing system according to an exemplary embodiment of the present invention.

FIG. 1 illustrates the overall configuration of an information processing system 9 according to an exemplary embodiment of the present invention. The information processing system 9 includes a server apparatus 1, a client apparatus 2, a communication network 3, and an execution apparatus 4.

The communication network 3, for example, the Internet, connects the server apparatus 1 and the client apparatus 2 to each other and relays information exchanged between the server apparatus 1 and the client apparatus 2.

The server apparatus 1 executes a desktop application program (hereinafter, referred to as a "desktop application") in response to a request received from the client apparatus 2. A desktop application is an application program to be executed by the server apparatus 1. When being executed, a desktop application makes a request to display an image based on content of its processing.

The server apparatus 1 also executes a server application program (hereinafter, referred to as a "VNC server application") implementing virtual network computing (hereinafter, abbreviated as "VNC"). VNC is a mechanism implemented by two computers that are connected to each other via a network and enables one of the two computers to be operated from the other of the two computers. Specifically, VNC causes a first computer to transmit information representing a screen to be displayed in a second computer, and causes the second computer to inform the first computer of an operation performed on the screen displayed in the second computer. At this time, a VNC server application executed in the server apparatus 1 transmits information representing a screen displayed in the server apparatus 1 to the client apparatus 2.

In response to a user operation, the client apparatus 2 requests the server apparatus 1 to execute a desktop application. Also, the client apparatus 2 executes a client application program implementing VNC (hereinafter, referred to as a "VNC client application"). The client apparatus 2 executes a VNC client application, thereby obtaining information transmitted by the VNC server application and generating, on the basis of this information, a screen displayed in the server apparatus 1. That is, the client apparatus 2 obtains, from the server apparatus 1, information representing a screen (hereinafter, referred to as a "first screen") generated as a result of the desktop application being executed.

In response to a user operation, the client apparatus 2 also requests the execution apparatus 4 to execute a web application program (hereinafter, referred to as a "web application"). A web application is an application program that uses a communication protocol for transmission and reception of content over a web, such as Hypertext Transfer Protocol (HTTP), in communication between a server and a client. A web application transmits and receives content as data handled by the communication protocol, and thus a web browser is sufficient as a user interface implemented in the client apparatus 2. The execution apparatus 4 receives a request to execute a web application from the client apparatus 2, and executes the web application in response to the request. The execution apparatus 4 then transmits the execution result of the web application to the client apparatus 2.

A web application is executed through communication between a server and a client. A single apparatus may serve as the server and the client. Accordingly, the above-described execution apparatus 4 may be the server apparatus 1, any apparatus connected to the client apparatus 2 via the communication network 3, or the client apparatus 2. In the case where the client apparatus 2 serves as the execution apparatus 4, a request to execute a web application need not be made via the communication network 3. In the example illustrated in FIG. 1, the execution apparatus 4 is an apparatus different from the server apparatus 1 and the client apparatus 2. The client apparatus 2 obtains, from the above-described execution apparatus 4, a screen (hereinafter, referred to as a "second screen") generated as a result of the web application being executed. This second screen is included in the execution result of the web application obtained by the execution apparatus 4.

Note that the information processing system 9 may include multiple server apparatuses 1 and multiple client apparatuses 2. In this case, each of the server apparatuses 1 may be configured to transmit information representing the first screen to the multiple client apparatuses 2; however, each of the client apparatuses 2 is configured to obtain the information representing the first screen from a corresponding one of the multiple server apparatuses 1.

The execution apparatus 4 that executes a web application may transmit, as the execution result of the web application, content represented in a markup language, such as HyperText Markup Language (HTML) or Extensible Markup Language (XML), to the client apparatus 2. Alternatively, the execution apparatus 4 may transmit content to be executed by the client apparatus 2, such as a script program. In this case, the second screen is generated as a result of the client apparatus 2 executing the transmitted script program or the like.

1-2. Configuration of Server Apparatus

Figure 2:
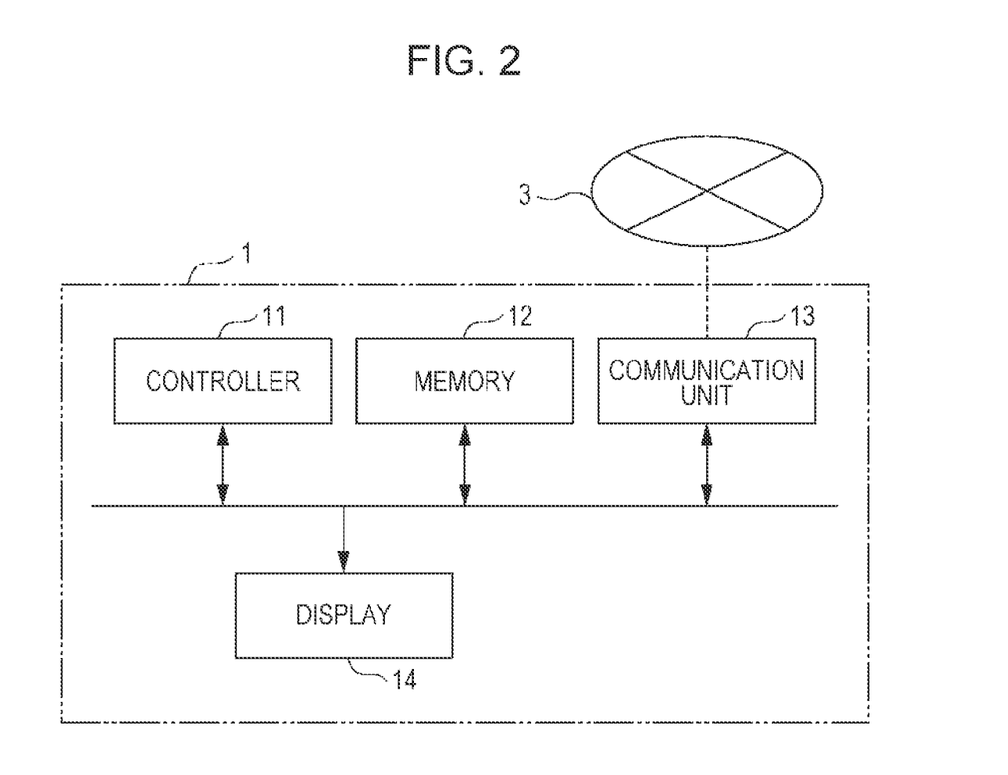
FIG. 2 illustrates the configuration of a server apparatus.

FIG. 2 illustrates the configuration of the server apparatus 1. The server apparatus 1 includes a controller 11, a memory 12, a communication unit 13, and a display 14. The controller 11 controls operation of each component of the server apparatus 1. The controller 11 includes a computation processing unit such as a central processing unit (CPU) and memory devices such as a read only memory (ROM) and a random access memory (RAM). The controller 11 executes programs stored in these memory devices.

The communication unit 13 is an interface that enables the server apparatus 1 to communicate with the client apparatus 2 via the communication network 3.

The memory 12 is a large capacity memory, such as a hard disk or flash memory, and stores programs to be loaded by the controller 11. These programs include desktop applications. Note that examples of the memory 12 may include a removable recording medium, such as a removable disk.

The display 14 is a liquid crystal display or the like, and displays an image in accordance with an instruction received from the controller 11.

Note that the server apparatus 1 may further include an operation unit that accepts a user operation.

1-3. Configuration of Client Apparatus

Figure 3:
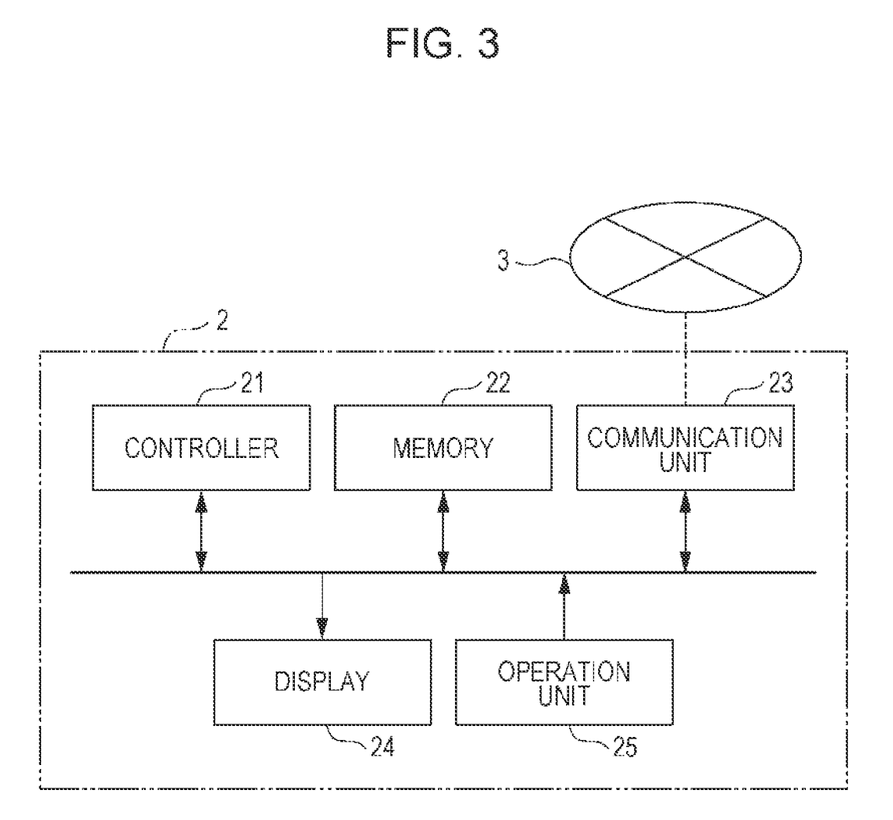
FIG. 3 illustrates the configuration of a client apparatus.

FIG. 3 illustrates the configuration of the client apparatus 2. The client apparatus 2 includes a controller 21, a memory 22, a communication unit 23, a display 24, and an operation unit 25. The controller 21 controls operation of each component of the client apparatus 2. The controller 21 includes a computation processing unit such as a CPU and memory devices such as a ROM and a RAM. The controller 21 executes programs stored in these memory devices.

The communication unit 23 is an interface that enables the client apparatus 2 to communicate with the server apparatus 1 via the communication network 3.

The memory 22 is a large capacity memory, such as a hard disk or flash memory, and stores programs to be loaded by the controller 21. Note that examples of the memory 22 may include a removable recording medium, such as a removable disk.

The display 24 is a liquid crystal display or the like, and displays an image in accordance with an instruction received from the controller 21.

The operation unit 25 includes a coordinate obtaining unit and operation buttons that accept various instructions. The operation unit 25 accepts a user operation, and supplies a signal corresponding to the operation content to the controller 21.

1-4. Functional Configuration of Information Processing System

Figure 4:
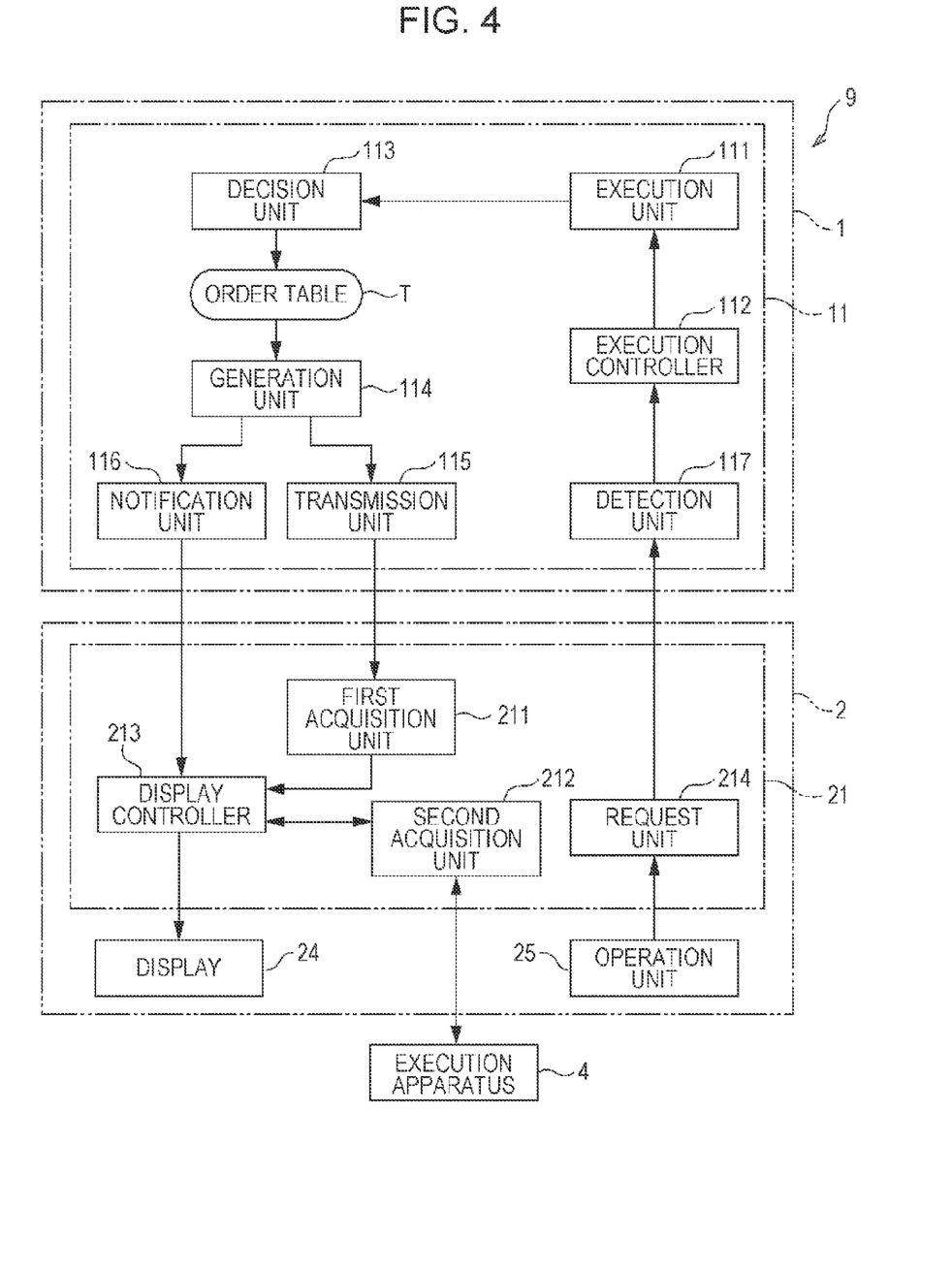
FIG. 4 illustrates the functional configuration of the information processing system.

FIG. 4 illustrates the functional configuration of the information processing system 9. Illustration of the communication unit 13 of the server apparatus 1, the communication unit 23 of the client apparatus 2, and the communication network 3 is omitted in FIG. 4.

The controller 11 of the server apparatus 1 functions as an execution unit 111, an execution controller 112, a decision unit 113, a generation unit 114, a transmission unit 115, a notification unit 116, and a detection unit 117.

The detection unit 117 detects identification information of a desktop application (first application) or web application (second application) for which an execution request has been made through a user operation performed on the client apparatus 2. This identification information is represented by a uniform resource identifier (URI). Hereinafter, a URI of a desktop application or web application is referred to as an "application URI". The controller 21 of the client apparatus 2 functions as a request unit 214 described later. This request unit 214 identifies an application URI of an application for which an execution request has been made through a user operation accepted by the operation unit 25, and transmits the application URI to the server apparatus 1. Accordingly, the detection unit 117 detects the application URI transmitted from the request unit 214 of the client apparatus 2. The execution unit 111 executes a desktop application.

The execution controller 112 determines which of a desktop application or a web application is requested by the client apparatus 2 to be executed, on the basis of the application URI detected by the detection unit 117. For example, the application URI indicating a web application generally includes a character string "webapp" in its path name. Thus, the execution controller 112 identifies the type of the execution-requested application by determining whether the application URI includes this character string. Alternatively, the execution controller 112 may identify the type of the execution-requested application by checking the host name or scheme name included in the application URI.

If a request to execute a desktop application has been made, the execution controller 112 causes the execution unit 111 to execute the desktop application.

If a request to execute a web application has been made, which indicates the case where the execution apparatus 4 executes a web application requested by the client apparatus 2, the execution controller 112 causes the execution unit 111 to execute a desktop application corresponding to the web application. This desktop application need not have functions of the corresponding web application and may be configured to simply make a request to display a window when being executed by the execution unit 111. Hereinafter, a desktop application corresponding to a web application is referred to as a "pseudo-application". Also, a window for which a display request is made as a result of a pseudo-application being executed is referred to as a "pseudo-window".

Suppose for example that the server apparatus 1 is running a program that generates, in response to specifying of a URI, a pseudo-application corresponding to the URI. When a request to execute a web application has been made by the client apparatus 2, the controller 11 of the server apparatus 1 provides, as a parameter, the application URI of this web application to the aforementioned program so as to cause the program to generate a pseudo-application. The generated pseudo-application is executed by the execution unit 111, generates a pseudo-window, and makes a request to display the pseudo-window.

The decision unit 113 decides upon an order in which windows (including the pseudo-window), for which display requests have been made as a result of corresponding desktop applications (including the pseudo-application) being executed by the execution unit 111, are to be viewed by a viewer. The decision unit 113 then supplies an order table T containing the decided order to the generation unit 114. Here, the order in which windows are to be viewed by a viewer is, for example, an order in which the windows are superposed with one another on a screen. For example, in a case where multiple windows are displayed so as to be superposed with one another in accordance with this order, a window assigned the first place in the order is viewed by a viewer. If this window assigned the first place in the order is closed, a window assigned the second place in the order, among the windows that have been hidden by the window assigned the first place in the order, is then viewed by the viewer.

The decision unit 113 assigns a place in the order to each window, on the basis of a timing at which a corresponding display request is made and display urgency information supplied along with the request, for example. The order table T is stored in, for example, the RAM of the controller 11 as a result of a process corresponding to the decision unit 113 being executed by the CPU of the controller 11.

The generation unit 114 generates the first screen from the windows, in accordance with the order table T. The order table T is read from, for example, the RAM of the controller 11 as a result of a process corresponding to the generation unit 114 being executed by the CPU of the controller 11.

Figure 5:
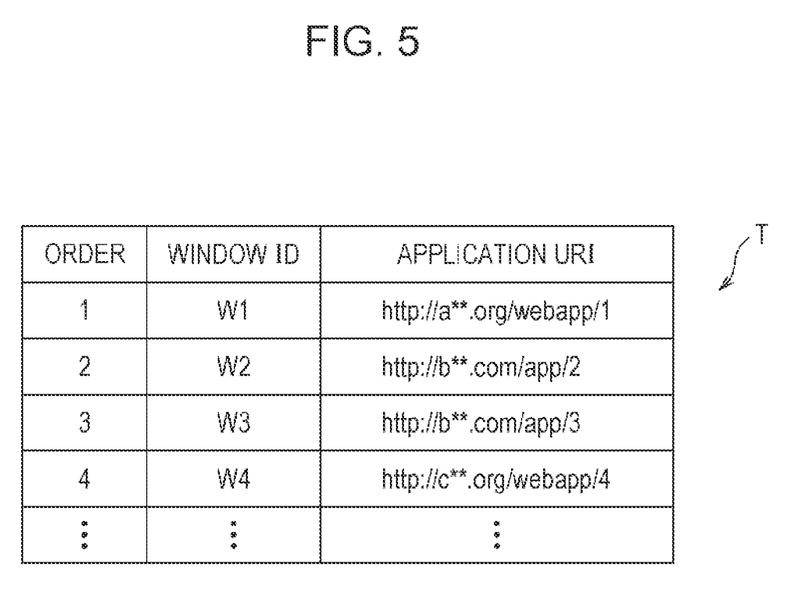
FIG. 5 illustrates an example of an order table.

FIG. 5 illustrates an example of the order table T. The order table T associates the application URI that indicates a corresponding application for which an execution request is made in the client apparatus 2, identification information (hereinafter, referred to as a "window ID") of a window for which a display request is made as a result of the server apparatus 1 executing the application indicated by this application URI, and the display order assigned to the window by the decision unit 113 with one another.

Figure 6A:
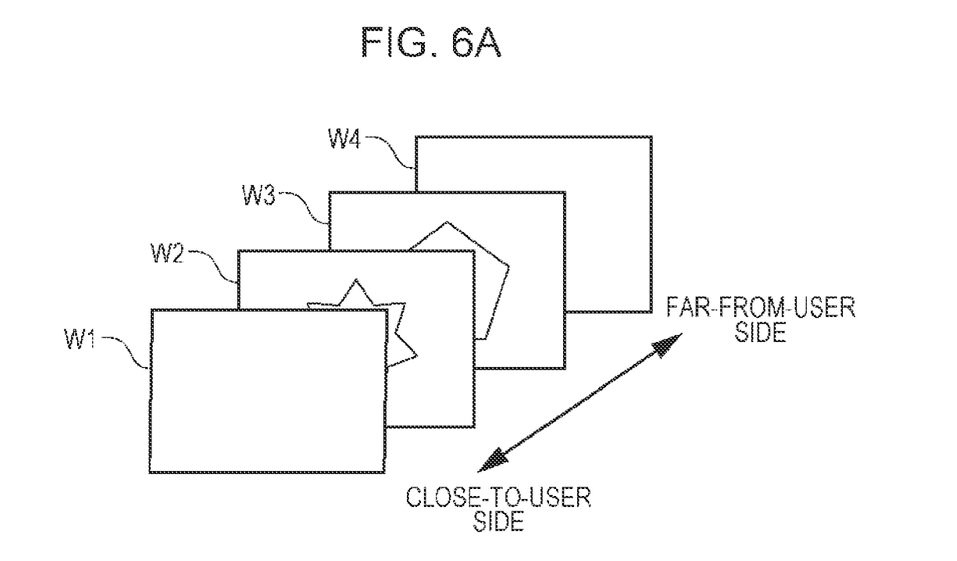
FIGS. 6A and 6B illustrate an order in which windows are superposed in accordance with the order table illustrated in FIG. 5.
Figure 6B:
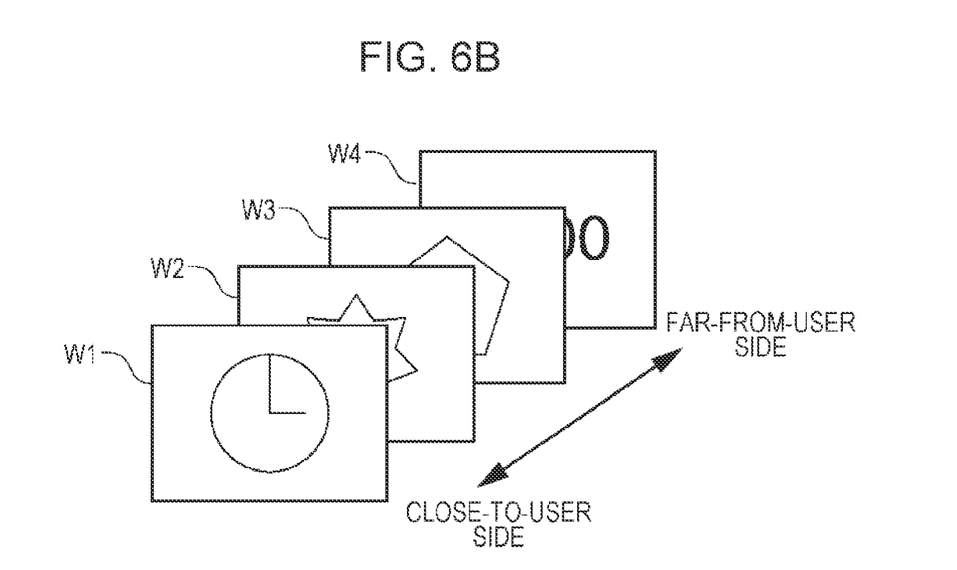

FIGS. 6A and 6B illustrate an order in which windows are superposed with one another in accordance with the order table T illustrated in FIG. 5. The smaller the number representing the place in the order assigned to a window, the closer to a user (viewer) the window is displayed in a direction in which the user (viewer) views the windows (hereinafter, referred to as a user's (viewer's) viewing direction). The window displayed at a position closest to the user is a window assigned the number "1".

As described above, in the case where a request to execute a web application is made by the client apparatus 2, the server apparatus 1 executes, instead of the web application, a corresponding pseudo-application which is a desktop application corresponding to the web application. As a result of execution of the pseudo-application, a pseudo-window corresponding to the web application is generated. The pseudo-window is a window displaying a white rectangular image, for example, and is displayed in the server apparatus 1 in accordance with its place in the order table T.

In the case where the generation unit 114 is supplied with the order table T illustrated in FIG. 5, the generation unit 114 generates the first screen by superposing windows with one another in the order of their window IDs "W4→W3→W2→W1" from the far-from-user side to the close-to-user side in the user's viewing direction. The windows assigned the window IDs "W1" and "W4" are pseudo-windows. Thus, in the first screen generated from the windows in accordance with the order table T by the controller 11 of the server apparatus 1, the windows assigned the window IDs "W1" and "W4" display white rectangular images as illustrated in FIG. 6A.

Note that the generation unit 114 may generate the first screen in such a manner that positions of the superposed windows are shifted from one another or the window located at the closest-to-user position in the user's viewing direction hides all the other windows behind this window in the user's viewing direction. In this case, a window that is actually displayed is the window located at the closest-to-user position in the user's viewing direction. Thus, the generation unit 114 may generate the first screen that displays the window assigned the number "1" in the order table T. Hereinafter, the case where the generation unit 114 generates, as the first screen, a screen that displays the window located at the closest-to-user position in the user's viewing direction will be described. The first screen generated by the generation unit 114 is displayed on the display 14 of the server apparatus 1.

The transmission unit 115 transmits information representing the first screen generated by the generation unit 114 to the client apparatus 2.

The notification unit 116 notifies the client apparatus 2 of identification information of the desktop application that has made a display request for the window displayed in the first screen. The window located at the closest-to-user position in the user's viewing direction is displayed in the first screen. If this window is not a pseudo-window, the notification unit 116 notifies the client apparatus 2 of, as the identification information, an application URI of a desktop application, for which an execution request has been made by the client apparatus 2 and which has made a request to display this window.

If the window displayed in the first screen is a pseudo-window, the desktop application that has made a request to display this pseudo-window is a pseudo-application. In this case, the notification unit 116 notifies the client apparatus 2 of, as the identification information, an application URI of a web application corresponding to the pseudo-application.

The controller 21 of the client apparatus 2 functions as a first acquisition unit 211, a second acquisition unit 212, a display controller 213, and the request unit 214.

In response to a user operation accepted by the operation unit 25, the request unit 214 requests the server apparatus 1 to execute an application. As described above, the request unit 214 transmits, to the server apparatus 1, an application URI identifying an execution-requested application regardless of whether the application specified by the user operation is a desktop application or a web application.

The first acquisition unit 211 acquires information representing the first screen from the server apparatus 1.

The display controller 213 causes the display 24 to display the first screen in the case where a window of a desktop application not corresponding to any web application is displayed in the first screen.

In the case where a window (pseudo-window) of a desktop application corresponding to a web application is displayed in the first screen, the display controller 213 supplies the second acquisition unit 212 with the application URI of the web application. When receiving the application URI of the web application from the display controller 213, the second acquisition unit 212 identifies the execution apparatus 4 on the basis of, for example, a description contained in the application URI, and requests the identified execution apparatus 4 to execute the web application indicated by the application URI. Then, the second acquisition unit 212 acquires information representing the second screen generated as a result of the execution apparatus 4 executing the web application, and the display controller 213 causes the display 24 to display the acquired second screen instead of the aforementioned first screen.

A desktop application not corresponding to any web application is a desktop application for which an execution request has been made by the client apparatus 2. On the other hand, a desktop application corresponding to a web application is a pseudo-application which the execution controller 112 of the server apparatus 1 has caused the execution unit 111 to execute, and a window of the pseudo-application is a pseudo-window. Thus, in the case where a pseudo-window is displayed in the first screen, the display controller 213 causes the display 24 to display the second screen. That is, the pseudo-window is replaced with the second screen. As a result, a screen in which the pseudo-windows "W1" and "W4" are replaced with windows of images representing execution results of the respective web applications is viewed by the user as illustrated in FIG. 6B.

1-5. Operation of Server Apparatus

Figure 7:
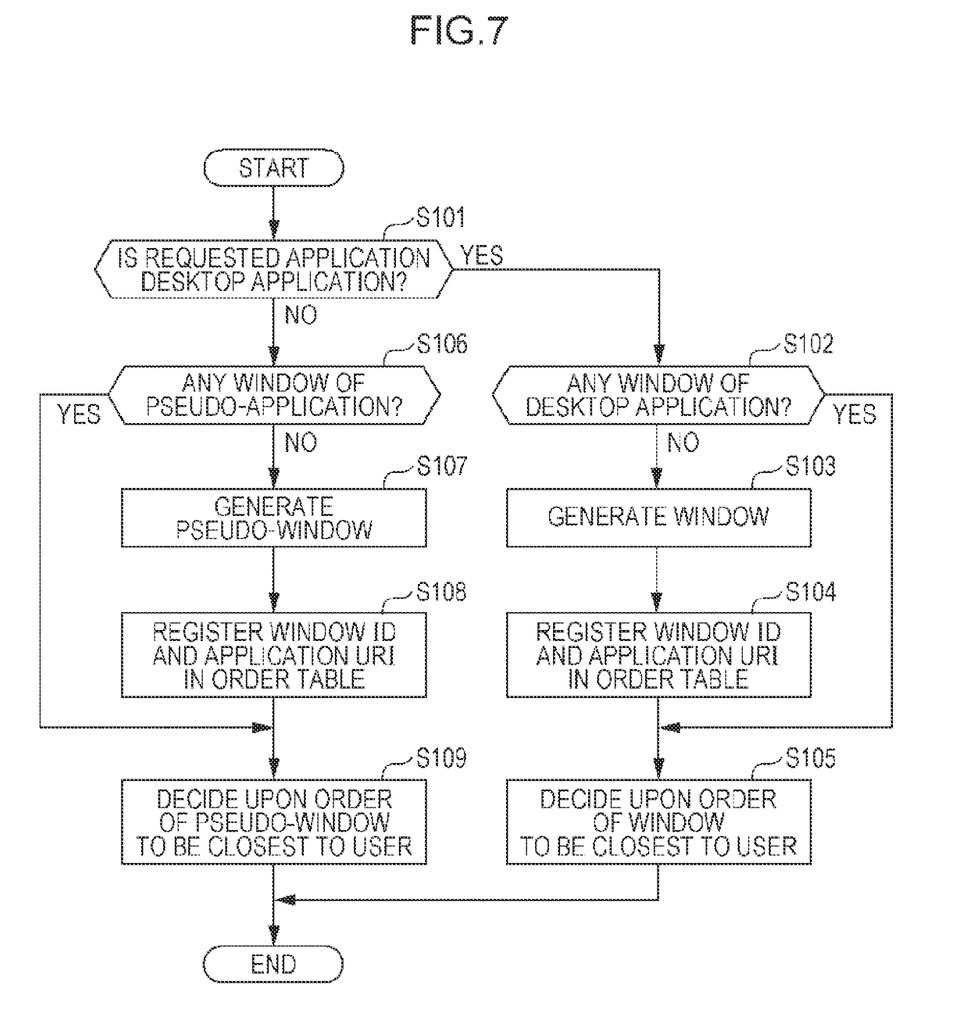
FIG. 7 is a flowchart illustrating an operation performed by the server apparatus to decide upon the order in which windows are superposed.

FIG. 7 is a flowchart illustrating an operation performed by the server apparatus 1 to decide upon an order in which windows are superposed with one another. When detecting an application URI of an application for which an execution request has been made by the client apparatus 2, the controller 11 of the server apparatus 1 determines whether the execution-requested application is a desktop application on the basis of the application URI (step S101). As described above, this determination is made, for example, based on whether the application URI includes a specific character string, such as "webapp".

If the controller 11 determines that the execution-requested application is a desktop application (YES in step S101), the controller 11 then determines whether a window of the desktop application already exists by referring to content of the RAM (step S102). If the controller 11 determines that this window does not exist (NO in step S102), the controller 11 newly generates this window (step S103).

The controller 11 then registers, in the order table T, a window ID assigned to the generated window and the application URI (step S104), and decides upon the order for the registered window ID to be the closest-to-user position (that is, "1") in the user's viewing direction (step S105). If the controller 11 determines that the window of the execution-requested desktop application already exists (YES in step S102), the controller 11 skips steps S103 and S104. The process then proceeds to step S105.

If the controller 11 determines that the execution-requested application is not a desktop application (NO in step S101), the controller 11 determines whether a pseudo-window corresponding to the execution-requested web application already exists (step S106). If the controller 11 determines that the pseudo-window corresponding to the execution-requested web application does not exist (NO in step S106), the controller 11 generates a corresponding pseudo-application by using the application URI of this web application as a parameter, and executes the pseudo-application so as to generate the corresponding pseudo-window (step S107).

The controller 11 then registers, in the order table T, a window ID assigned to the generated pseudo-window and the application URI (step S108), and decides upon the order for the registered window ID to be the closest-to-user position (that is, "1") in the user's viewing direction (step S109). If the controller 11 determines that the pseudo-window corresponding to the execution-requested web application already exists (YES in step S106), the controller 11 skips steps S107 and S108. The process then proceeds to step S109.

Figure 8:
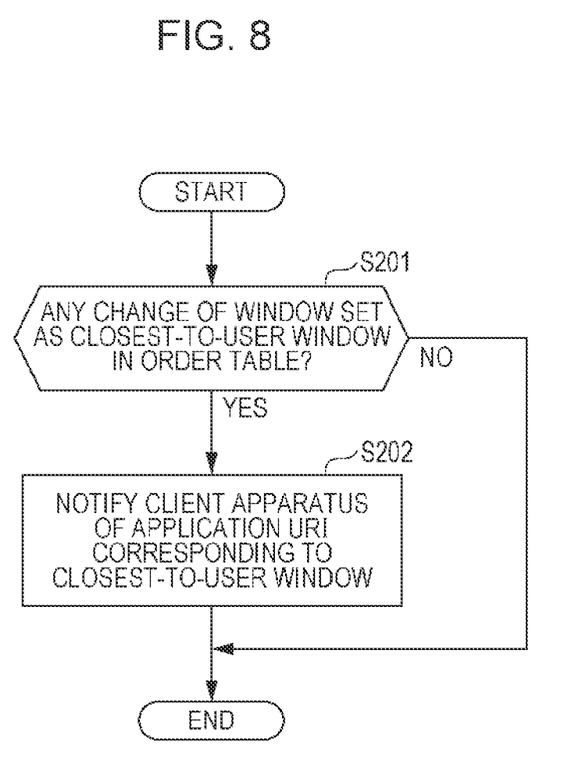
FIG. 8 is a flowchart illustrating an operation performed by the server apparatus to notify the client apparatus of identification information of an application corresponding to a window displayed in the server apparatus at a position closest to a viewer in a direction in which the viewer views the window.

FIG. 8 is a flowchart illustrating an operation performed by the server apparatus 1 to notify the client apparatus 2 of identification information of an application corresponding to a window displayed in the server apparatus 1 at the closest-to-user position in the user's viewing direction. The controller 11 of the server apparatus 1 monitors access to the order table T for a change in the window ID assigned the closest-to-user position in the order table T (step S201). If the controller 11 determines that the window ID assigned the closest-to-user position in the order table T has not changed (NO in step S201), the controller 11 terminates the process. If the controller 11 determines that the window ID assigned the closest-to-user position in the order table T has changed (YES in step S201), the controller 11 notifies the client apparatus 2 of the application URI corresponding to a window indicated by the new window ID, that is, the application URI of an application that has generated the window newly assigned the closest-to-user position (step S202).

1-6. Operation of Client Apparatus

Figure 9:
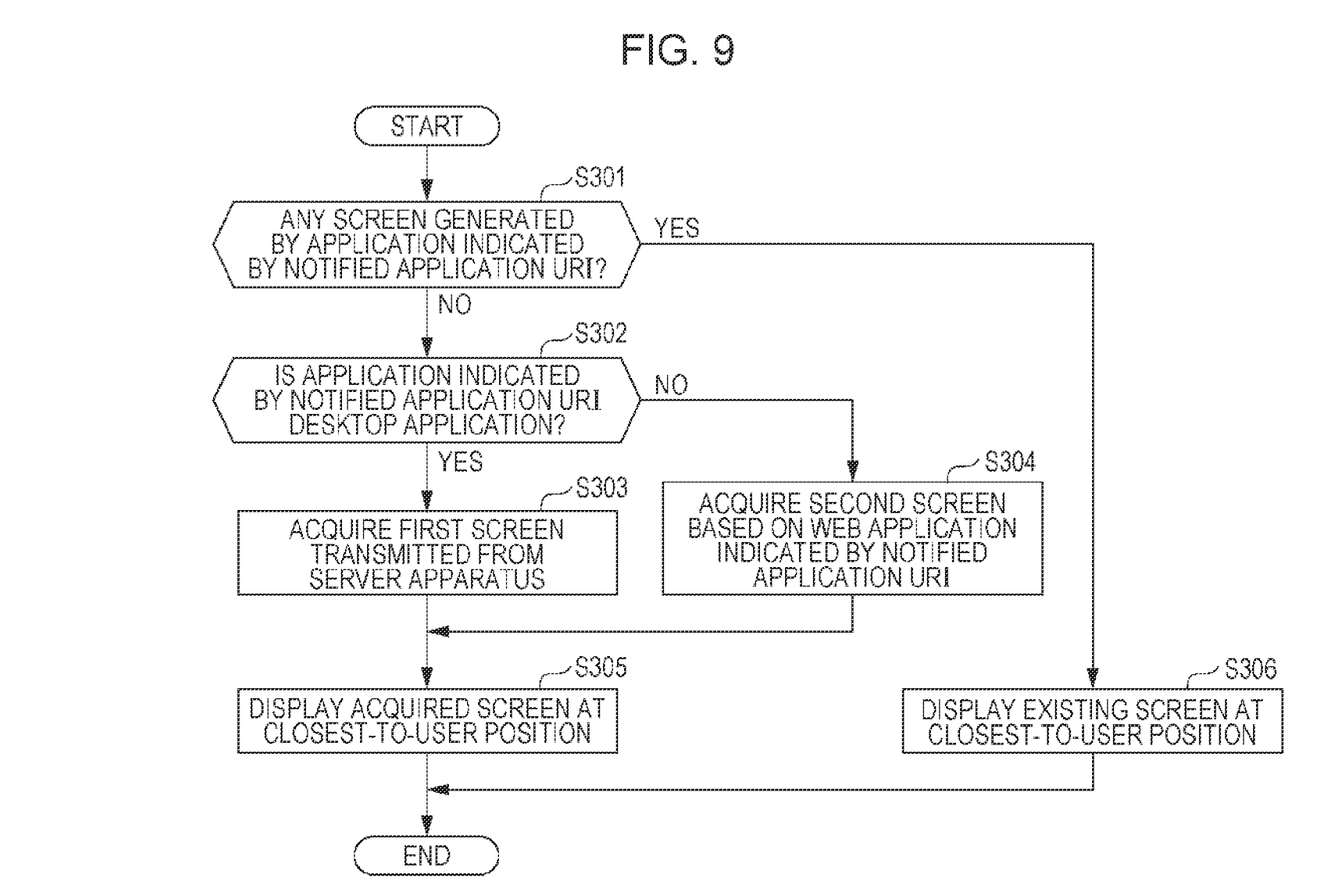
FIG. 9 is a flowchart illustrating an operation performed by the client apparatus to change the displayed screen in response to a notification received from the server apparatus.

FIG. 9 is a flowchart illustrating an operation performed by the client apparatus 2 to change the displayed screen in response to a notification received from the server apparatus 1. The controller 21 of the client apparatus 2 determines whether there already exists a window generated by an application indicated by the application URI which the client apparatus 2 has been notified of by the server apparatus 1 (step S301). If the controller 21 determines that this window does not exist (NO in step S301), the controller 21 determines whether the application indicated by the notified application URI is a desktop application executed by the server apparatus 1 (step S302). If the controller 21 determines that the application indicated by the notified application URI is a desktop application (YES in step S302), the controller 21 acquires information representing the first screen transmitted from the server apparatus 1 (step S303).

If the controller 21 determines that the application indicated by the notified application URI is not a desktop application (NO in step S302), the controller 21 acquires information representing the second screen generated by a web application indicated by the notified application URI (step S304).

Then, the controller 21 displays the first screen acquired in step S303 or the second screen acquired in step S304 at the closest-to-user position (step S305).

If the controller 21 determines in step S301 that there already exists the window generated by the application indicated by the application URI which the client apparatus 2 has been notified of by the server apparatus 1 (YES in step S301), the controller 21 displays this window at the closest-to-user position (step S306).

Figure 10:
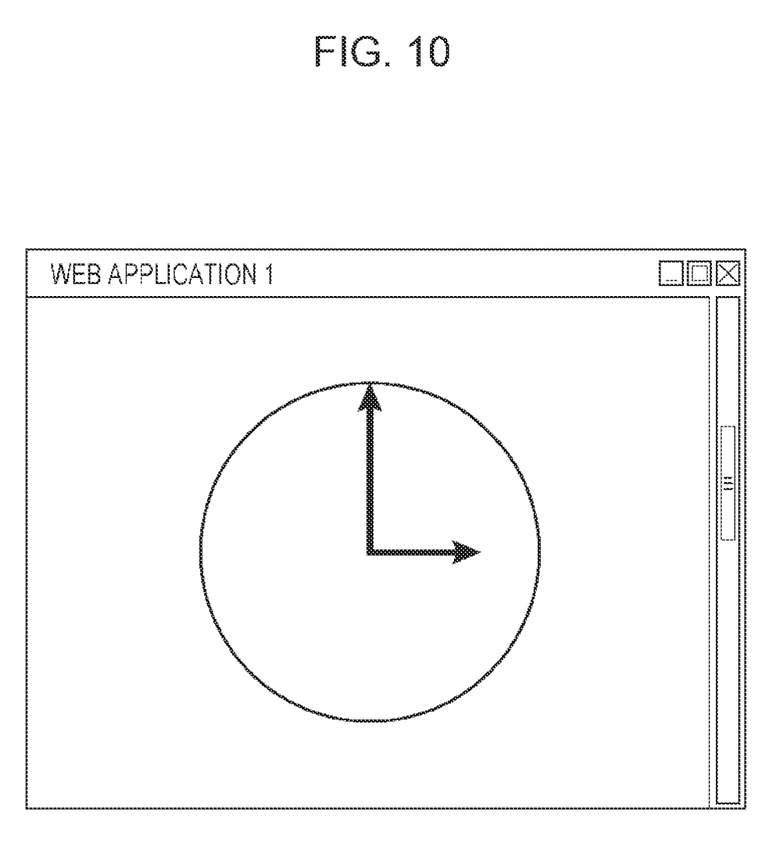
FIG. 10 illustrates an example of a screen displayed in the client apparatus in accordance with the order table illustrated in FIG. 5.

FIG. 10 illustrates an example of a screen displayed in the client apparatus 2 in accordance with the order table T illustrated in FIG. 5. The order table T indicates that a window requested by an application indicated by an application URI "http://a**.org/webapp/1" is assigned the order "1". Because this application URI includes a character string "webapp", this application URI is of a web application.

Thus, the controller 11 of the server apparatus 1 executes a corresponding pseudo-application instead of this web application, so as to generate a pseudo-window corresponding to this web application. Because the order of this pseudo-window indicates the closest-to-user position in the user's viewing direction, the server apparatus 1 transmits information representing the first screen displaying this pseudo-window.

The web application, on the other hand, is executed by the execution apparatus 4. This web application has, for example, a function of displaying a clock having the long and short hands and of presenting the current time to the user. The execution apparatus 4 executes the web application so as to generate the second screen displaying the clock. The client apparatus 2 acquires information representing this second screen.

The server apparatus 1 notifies the client apparatus 2 of, as the identification information, the application URI of the web application corresponding to the pseudo-application that has made a request to display the pseudo-window in the first screen. Because the notified identification information is identification information of the web application, the client apparatus 2 causes the display 24 to display the second screen generated as a result of this web application being executed. As a result, a window including a clock based on the web application is displayed in the client apparatus 2 as illustrated in FIG. 10.

Through the operations described above, the information processing system 9 enables integration of desktop applications executed by the server apparatus 1 and web applications executed by the execution apparatus 4. Thus, existing window display order management performed by the server apparatus 1 is applied not only to windows of desktop applications executed by the server apparatus 1 but also to windows of web applications not executed by the server apparatus 1. Specifically, in the first screen generated as a result of the server apparatus 1 executing desktop applications (first applications) and the second screen generated as a result of an apparatus other than the server apparatus 1 executing web applications (second application), windows are displayed in accordance with the order decided by the server apparatus 1. In this way, desktop applications and web applications are handled seamlessly by the user. That is, there is no need to re-develop existing desktop applications as new web applications in order to allow the user to have the same operation feeling when operating existing desktop applications and web applications.

2. Modifications

The exemplary embodiment has been described above. This exemplary embodiment may be modified in the following manner. Note that modifications described below may be made in combination.

2-1. First Modification

In the above-described exemplary embodiment, a pseudo-window is a window displaying a white rectangular image; however, a pseudo-window may be a window which informs the user that a window of a web application corresponding to the pseudo-application is to be displayed.

Figure 11:
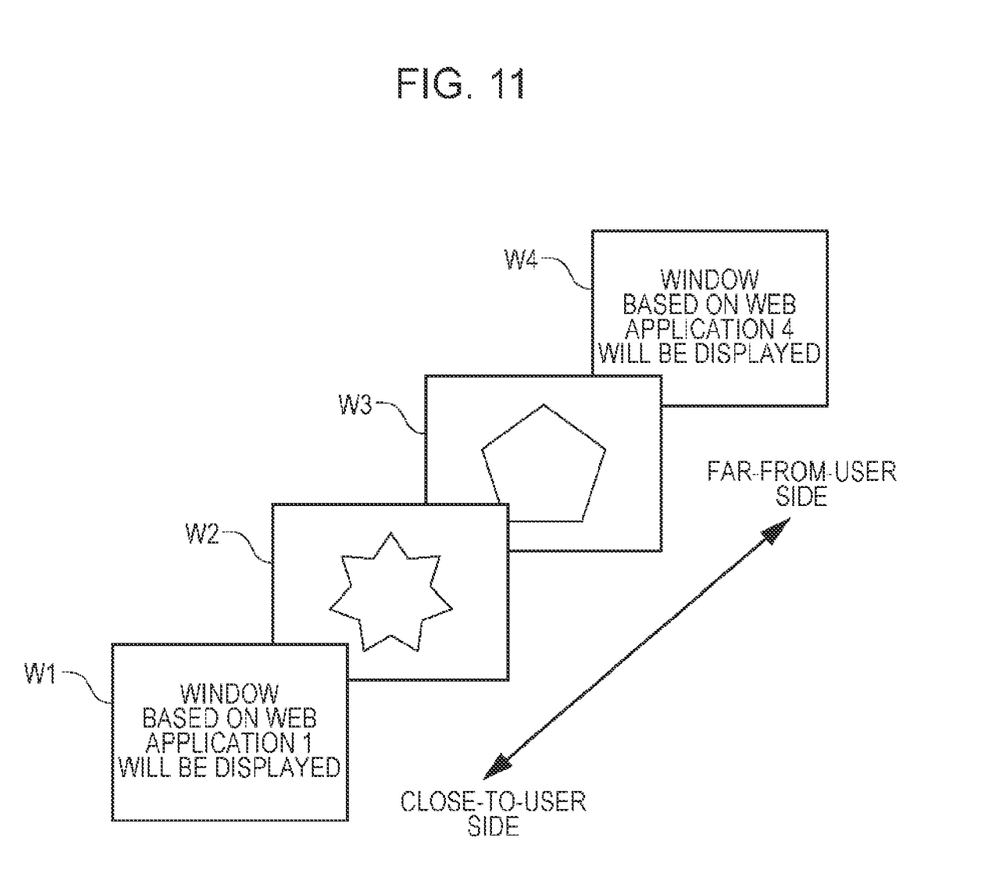
FIG. 11 illustrates an example of pseudo-windows that inform a viewer that windows of web applications are to be displayed.

FIG. 11 illustrates an example of pseudo-windows each informing the user that a window of a web application is to be displayed. In the case where a request to execute a web application is made by the client apparatus 2, a pseudo-window generated in the server apparatus 1 may display a message indicating that "window based on a corresponding web application will be displayed" as illustrated in FIG. 11.

There may be a case where a waiting time occurs from when the client apparatus 2 acquires information representing the first screen to when the client apparatus 2 acquires information representing the second screen, because the speed at which the execution apparatus 4 generates the second screen is slower than the speed at which the server apparatus 1 generates the first screen. Even in such a case, the above-described message is displayed in the pseudo-window of the first screen in this configuration. Thus, the display status of the client apparatus 2 is grasped by the user.

2-2. Second Modification

In the above-described exemplary embodiment, an application URI which is a URI of an application is used as identification information of a desktop application or web application for which an execution request has been made in the client apparatus 2 through a user operation; however, other information may be used as the identification information. For example, information including an Internet Protocol (IP) address supplied from a domain name system (DNS) server may be used as the identification information of an execution-requested desktop application or web application.

2-3. Third Modification

In the above-described exemplary embodiment, the first screen generated by the generation unit 114 is displayed on the display 14 of the server apparatus 1; however, this first screen need not be displayed in the server apparatus 1. In this case, information representing the first screen may be stored in, for example, the RAM of the controller 11 and transmitted to the client apparatus 2. If the server apparatus 1 has this configuration, the server apparatus 1 need not include the display 14.

2-4. Fourth Modification

In the above-described exemplary embodiment, the controller 11 notifies the client apparatus 2 of an application URI corresponding to a window newly assigned the order indicating the closest-to-user position when the controller 11 determines that the window ID assigned the order indicating the closest-to-user position in the order table T has changed; however, there may be a case where this notification is not made even when the window ID has changed. For example, in the case where applications that have caused windows indicated by the window IDs to be displayed before and after the change are all desktop applications, the controller 11 need not make this notification. In this case, the displayed screen is not changed in the client apparatus 2 and the first screen is continuously displayed.

2-5. Fifth Modification

In the above-described exemplary embodiment, the controller 21 of the client apparatus 2 acquires information representing the first screen from the server apparatus 1 in the case where the controller 21 determines that an application indicated by the application URI which the client apparatus 2 has been notified of by the server apparatus 1 is a desktop application; however, the controller 21 may acquire the information representing the first screen in other cases. Also, the controller 21 of the client apparatus 2 acquires information representing the second screen generated by a web application indicated by the notified application URI in the case where the controller 21 determines that the application indicated by the notified application URI is not a desktop application; however, the controller 21 may acquire the information representing the second screen in other cases. In this case, the controller 21 may acquire both pieces of information representing the first screen and the second screen, and may decide which of these screens includes a window that is displayed at the closest-to-user position in the user's viewing direction in accordance with content of the notification made by the server apparatus 1.

However, by configuring the client apparatus 2 to acquire the information representing the first screen or the information representing the second screen in accordance with the application URI which the client apparatus 2 has been notified of by the server apparatus 1 as described in the exemplary embodiment above, the client apparatus 2 need not acquire information of a screen not to be displayed.

2-6. Sixth Modification

In the above-described exemplary embodiment, the client apparatus 2 requests the execution apparatus 4 to execute a web application; however, the server apparatus 1 may request the execution apparatus 4 to execute the web application. In this case, when a request to execute a web application is made by the client apparatus 2, the server apparatus 1 may execute a pseudo-application which is a desktop application corresponding to the web application and request the execution apparatus 4 indicated by the application URI of the web application to execute the web application.

Also, in this case, the server apparatus 1 may periodically make an inquiry as to whether the client apparatus 2 makes a request to execute a web application, to the client apparatus 2 that has made a request to execute a desktop application, for example. The controller 21 of the client apparatus 2 may store, in the RAM, application URIs of web and desktop applications for which execution requests are made. In response to an inquiry from the server apparatus 1, the controller 21 may transmit the application URI of the web application.

2-7. Seventh Modification

In the above-described exemplary embodiment, the display 24 displays the first screen or the second screen; however, the display 24 may display, in addition to these screens, the application URI of a desktop application or web application that has caused the closest-to-user window to be displayed in these screens.

An area in which the application URI is displayed by the display 24 may be a component, such as a textbox, which accepts a user's input. In this case, when an application URI is input in this display area by the user, the client apparatus 2 may transmit this application URI to the server apparatus 1, and may request the server apparatus 1 or the execution apparatus 4 to execute a desktop application or web application identified by this application URI. With this configuration, a request to execute a desktop application or web application indicated by an application URI input by the user is made.

2-8. Eighth Modification

Programs executed by the controller 11 of the server apparatus 1 and the controller 21 of the client apparatus 2 may be provided in a state where they are recorded on a computer-readable recording medium, such as a magnetic recording medium such as a magnetic tape or magnetic disk, an optical recording medium such as an optical disc, a magneto-optical recording medium, or a semiconductor memory. Alternatively, these programs may be downloaded via the Internet. Various devices other than CPUs may be used as controllers, which are illustratively described as the controllers 11 and 21. For example, dedicated processors may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising: a server apparatus;

and a client apparatus, the server apparatus including at least one first processor configured to implement: an execution unit that executes a plurality of first applications each of which makes a display request to display a corresponding image;

an execution controller that, in a case where a second application which is an application of a different type from the first applications and for which an execution request has been made by the client apparatus is executed by the server apparatus, causes the execution unit to execute one of the first applications that corresponds to the second application;

a decision unit that decides upon an order in which images, for which the display requests have been made as a result of the plurality of first applications being executed by the execution unit, are to be viewed by a viewer, wherein the order is decided based on at least one of a time each of the display requests is made and display urgency information supplied with each of the display requests;

a generation unit that generates a first screen from the images in accordance with the order decided by the decision unit; and a transmission unit that transmits information representing the first screen generated by the generation unit to the client apparatus, the client apparatus including:

at least one second processor configured to implement:

a request unit that makes an execution request to execute any one of the first applications and an execution request to execute the second application;

a first acquisition unit that acquires the information representing the first screen from the server apparatus; and a second acquisition unit that acquires information representing a second screen generated as a result of the second application being executed by the server apparatus; and a display configured to display the first screen, wherein the at least one second processor is further configured to implement a display controller that, in a case where the first screen includes the image of the one of the first applications that corresponds to the second application, causes the display to display the second screen generated as a result of the second application being executed.

2. The information processing system according to claim 1, wherein the at least one first processor is further configured to implement a notification unit that notifies the client apparatus of identification information of the first application that has made the display request for the image displayed in the first screen, and wherein in a case where the identification information which the client apparatus is notified of by the notification unit is identification information of the one of the first applications that corresponds to the second application, the display controller of the client apparatus causes the display to display the second screen generated as a result of the second application being executed.

3. The information processing system according to claim 2, wherein the generation unit generates, in accordance with the order decided by the decision unit, the first screen in which the images are superposed with one another from a far-from-viewer side to a close-to-viewer side in a direction in which the viewer views the images, and the notification unit notifies the client apparatus of identification information of the first application that has made the display request for the image displayed at a closest-to-viewer position in the direction in the first screen.

4. The information processing system according to claim 1, wherein the image of the one of the first applications that corresponds to the second application is an image that informs the viewer that the second screen is to be displayed.

5. The information processing system according to claim 2, wherein the image of the one of the first applications that corresponds to the second application is an image that informs the viewer that the second screen is to be displayed.

6. The information processing system according to claim 3, wherein the image of the one of the first applications that corresponds to the second application is an image that informs the viewer that the second screen is to be displayed.

7. A client apparatus configured to communicate with a server apparatus, the server apparatus including an execution unit that executes a plurality of first applications each of which makes a display request to display a corresponding image, an execution controller that, in a case where a second application is executed by the server apparatus, causes the execution unit to execute one of the first applications that corresponds to the second application, a decision unit that decides upon an order in which images, for which the display requests have been made as a result of the plurality of first applications being executed by the execution unit, are to be viewed by a viewer, the order being decided based on at least one of a time each of the display requests is made and display urgency information supplied with each of the display requests, a generation unit that generates a first screen from the images in accordance with the order decided by the decision unit, and a transmission unit that transmits information representing the first screen generated by the generation unit, the client apparatus comprising:

at least one processor configured to implement:

a request unit that makes an execution request to execute any one of the first applications and an execution request to execute the second application;

a first acquisition unit that acquires the information representing the first screen from the server apparatus; and a second acquisition unit that acquires information representing a second screen generated as a result of the second application being executed by the server apparatus; and a display that displays the first screen, wherein the at least one processor is further configured to implement a display controller that, in a case where the first screen includes the image of the one of the first applications that corresponds to the second application, causes the display to display the second screen generated as a result of the second application being executed.

8. A server apparatus configured to communicate with a client apparatus, the client apparatus including a request unit that makes an execution request to execute any one of a plurality of first applications and an execution request to execute a second application, a first acquisition unit that acquires information representing a first screen generated as a result of the first application being executed, a second acquisition unit that acquires information representing a second screen generated as a result of the second application being executed by the server apparatus, a display that displays the first screen, and a display controller that, in a case where the first screen includes an image of one of the first applications that corresponds to the second application, causes the display to display the second screen generated as a result of the second application being executed, the server apparatus comprising at least one processor configured to implement:
- an execution unit that executes the plurality of first applications each of which makes a display request to display a corresponding image;
- an execution controller that, in a case where the second application for which the execution request has been made by the client apparatus is executed by the server apparatus, causes the execution unit to execute the one of the first applications that corresponds to the second application;
- a decision unit that decides upon an order in which images, for which the display requests have been made as a result of the plurality of first applications being executed by the execution unit, are to be viewed by a viewer, wherein the order is decided based on at least one of a time each of the display requests is made and display urgency information supplied with each of the display requests;
- a generation unit that generates the first screen from the images in accordance with the order decided by the decision unit; and
- a transmission unit that transmits the information representing the first screen generated by the generation unit to the client apparatus.

9. A non-transitory computer readable medium storing a program causing a computer to execute a process, the computer being configured to communicate with a server apparatus including an execution unit that executes a plurality of first applications each of which makes a display request to display a corresponding image, an execution controller that, in a case where a second application is executed by the server apparatus, causes the execution unit to execute one of the first applications that corresponds to the second application, a decision unit that decides upon an order in which images, for which the display requests have been made as a result of the plurality of first applications being executed by the execution unit, are to be viewed by a viewer, the order being decided based on at least one of a time each of the display requests is made and display urgency information supplied with each of the display requests, a generation unit that generates a first screen from the images in accordance with the order decided by the decision unit, and a transmission unit that transmits information representing the first screen generated by the generation unit, the process comprising:
- making an execution request to execute any one of the first applications and an execution request to execute the second application;
- acquiring the information representing the first screen from the server apparatus; acquiring information representing a second screen generated as a result of the second application being executed by the server apparatus;
- displaying the first screen; and
- causing, in a case where the first screen includes the image of the one of the first applications that corresponds to the second application, the display to display the second screen generated as a result of the second application being executed.

* * * * *